US012806643B2

(12) United States Patent
Liang et al.

(10) Patent No.: US 12,806,643 B2
(45) Date of Patent: Nov. 24, 2026

(54) ALL-PLASTIC RECYCLABLE PRESSING PUMP

(71) Applicant: MAJESTY HOLDINGS CO., LTD., Zhongshan (CN)

(72) Inventors: Peihui Liang, Zhongshan (CN); Maoyong Zhu, Zhongshan (CN); Jinkao Liang, Zhongshan (CN); Yonglei Zhang, Zhongshan (CN)

(73) Assignee: MAJESTY HOLDINGS CO., LTD., Zhongshan (CN)

( * ) Notice: Subject to any disclaimer, the term of this patent is extended or adjusted under 35 U.S.C. 154(b) by 77 days.

(21) Appl. No.: 18/940,668

(22) Filed: Nov. 7, 2024

(65) Prior Publication Data

US 2025/0345817 A1 Nov. 13, 2025

(30) Foreign Application Priority Data

May 9, 2024 (CN) ........................ 202410570900.3

(51) Int. Cl.
*B05B 11/10* (2023.01)
*F04B 23/02* (2006.01)

(52) U.S. Cl.
CPC ........ *B05B 11/1001* (2023.01); *F04B 23/028* (2013.01)

(58) Field of Classification Search
CPC ............. B05B 11/1047; B05B 11/1023; B05B 11/1059; B05B 11/1074; B05B 11/106
See application file for complete search history.

(56) References Cited

U.S. PATENT DOCUMENTS 4,318,498 A * 3/1982 Magers .................... B67D 1/10 285/902
4,991,746 A * 2/1991 Schultz ............... B05B 11/1023 222/321.3
5,401,148 A * 3/1995 Foster ................. B05B 11/0064 417/547
5,570,819 A * 11/1996 Uehira ................ B05B 11/1001 222/255
5,615,806 A * 4/1997 Grothoff ............. B05B 11/1059 222/384
5,899,363 A * 5/1999 Bliss, III ............. B05B 11/0029 222/321.9

(Continued)

FOREIGN PATENT DOCUMENTS

CN 120362068 A * 7/2025 ......... B05B 11/1074
JP 2024049867 A * 4/2024 ......... B05B 11/1069

*Primary Examiner* — Michael A Riegelman
(74) *Attorney, Agent, or Firm* — LOZA & LOZA, LLP; Michael F. Fedrick

(57) ABSTRACT

Disclosed is an all-plastic recyclable pressing pump, including a pump body, where the pump body is provided with a pump chamber, and a bottle locking cap is connected to the pump body; a liquid extraction assembly is provided in the pump chamber; the liquid extraction assembly includes a pump rod, and a bent nozzle is connected to an upper end of the pump rod; a liquid outlet channel is arranged in the bent nozzle, and a locking cap is provided in the pump chamber; the pump rod between the locking cap and the bent nozzle is provided with an annular elastic piece; the annular elastic piece is provided with at least two outwardly protruding protrusions, and an inwardly recessed recess is arranged between two adjacent protrusions.

9 Claims, 5 Drawing Sheets

(56) References Cited

U.S. PATENT DOCUMENTS

| | | | | |
|---|---|---|---|---|
| 8,672,190 | B1 * | 3/2014 | Wang | B05B 11/106 222/321.9 |
| 9,156,047 | B2 * | 10/2015 | Wang | B05B 11/1008 |
| 11,084,054 | B2 * | 8/2021 | Liang | B05B 11/1026 |
| 11,415,120 | B2 * | 8/2022 | Liang | F04B 23/023 |
| 12,053,789 | B2 * | 8/2024 | Liang | F16K 15/147 |
| 2013/0200106 | A1 * | 8/2013 | Kang | B05B 11/1047 222/384 |
| 2014/0084027 | A1 * | 3/2014 | Wang | B05B 11/1023 222/321.9 |
| 2018/0339305 | A1 * | 11/2018 | Wang | B05B 11/1092 |
| 2020/0246820 | A1 * | 8/2020 | Liang | B05B 11/1047 |
| 2021/0000306 | A1 * | 1/2021 | Arminak | A47K 5/14 |
| 2021/0229123 | A1 * | 7/2021 | Liang | B05B 11/1023 |
| 2021/0291212 | A1 * | 9/2021 | Liang | B05B 11/1023 |
| 2021/0291214 | A1 * | 9/2021 | Liang | B05B 11/1059 |
| 2021/0381498 | A1 * | 12/2021 | Liang | B05B 11/106 |
| 2024/0253072 | A1 * | 8/2024 | Liang | B05B 11/1074 |
| 2025/0099995 | A1 * | 3/2025 | Liang | B05B 11/1023 |
| 2025/0345817 | A1 * | 11/2025 | Liang | B05B 11/1001 |
| 2025/0345818 | A1 * | 11/2025 | Liang | B05B 11/1087 |

* cited by examiner

ALL-PLASTIC RECYCLABLE PRESSING PUMP

FIELD OF THE INVENTION

The present disclosure relates to the technical field of pressing pumps, and particularly to an all-plastic recyclable pressing pump.

BACKGROUND OF THE INVENTION

A pressing pump is a kind of liquid dispenser that utilizes the principle of atmospheric equilibrium to pump out the liquid in the bottle by pressing and replenish the outside atmosphere into the bottle. A pressing pump typically contains one piston that moves in the pump chamber when a user first presses the pump. The spring is compressed, the outlet channel is opened, and at the same time, the air in the pump chamber is discharged through the outlet channel. Subsequently, when the user releases the pump head, under the force of the spring, the piston moves upwards, and the outlet channel is closed. At this time, the air in the pump chamber is sealed, forming a negative pressure. In order to balance the internal and external pressures, the emulsion in the bottle is sucked into the pump chamber through a liquid guide pipe until the internal and external pressures are balanced. Finally, when the user presses the pump head again, the piston moves down, and the outlet channel is opened. Thus, the emulsion is ejected from the nozzle under pressure.

In order to achieve the standard of efficient recycling, all components of the pressing pump are sometimes made of plastic. At the present stage, in order to reduce the elastic coefficient, the return spring for the pressing pump is often arranged with a notch on the plastic spring. For example, the patent document No. 202220132383.8, entitled "All-plastic Recyclable Self-locking Pump" discloses a pressing pump using a plastic annular piece as a return piece. A side surface of the plastic annular piece is arranged with a vertical opening, which has two disadvantages. First, when the plastic annular piece is deformed, the thrust is generated in the vertical direction, and at the same time, the lateral thrust is inevitably generated so that the friction between the components increases when moving, affecting the liquid discharging effect. Second, the vertical opening will reduce the structural strength of the plastic annular piece, thereby affecting its service life.

The present disclosure has been made based on the above-mentioned situation.

SUMMARY OF THE INVENTION

The present disclosure overcomes the deficiencies of the related art and provides an all-plastic recyclable pressing pump that can move smoothly and has high structural strength.

The present disclosure is achieved by the following technical solution.

An all-plastic recyclable pressing pump is provided, including a pump body, where the pump body is provided with a pump chamber with a lower part for liquid to enter, and a bottle locking cap is connected to the pump body; a liquid extraction assembly capable of moving up and down in the pump chamber to extract liquid in the bottle upwards is provided in the pump chamber; the liquid extraction assembly includes a pump rod, and a bent nozzle capable of driving the operation of the liquid extraction assembly is connected to an upper end of the pump rod; a liquid outlet channel is arranged in the bent nozzle, and a locking cap capable of limiting the liquid extraction assembly from disengaging from the pump chamber is provided in the pump chamber; a latching mechanism capable of limiting a downward movement of the bent nozzle when the bent nozzle stays in a latching position is provided between the pump rod and the locking cap; a scavenge port is arranged on a wall of the pump chamber; a lower end of the pump chamber is provided with a one-way valve capable of allowing the liquid in the bottle body to pass through and enter the pump chamber when the liquid extraction assembly moves; a lower part of the liquid extraction assembly is provided with a control valve capable of controlling the liquid in the pump chamber to be ejected from the liquid outlet channel; the locking cap is provided with a lower conical projection with a small upper part and a large lower part; the bent nozzle is provided with an upper conical projection with a large upper part and a small lower part; the pump rod between the locking cap and the bent nozzle is provided with an annular elastic piece capable of resetting the liquid extraction assembly after the liquid extraction assembly is pressed down; the annular elastic piece is provided with at least two outwardly protruding protrusions, and an inwardly recessed recess is arranged between two adjacent protrusions.

According to the above-mentioned all-plastic recyclable pressing pump, an inner wall of the annular elastic piece is provided with inwardly protruding reinforcing ribs.

According to the above-mentioned all-plastic recyclable pressing pump, the protrusion and the recess are both arc-shaped.

According to the above-mentioned all-plastic recyclable pressing pump, a liquid extraction channel is arranged in the pump rod, and an upper part of the liquid extraction channel is communicated with the liquid outlet channel; the control valve includes a liquid inlet arranged at a lower part of the pump rod and communicating the liquid extraction channel and the pump chamber; an outer side of the pump rod is sleeved by a suction plug capable of sliding relative to the pump rod and sealing the liquid inlet, and an outer wall of the pump rod is provided with a driving structure capable of driving the suction plug to slide; the lower part of the pump chamber is provided with a conical part capable of limiting the downward sliding of the suction plug and allowing the lower part of the pump rod to be inserted; the bottom of the pump rod is provided with a conical sealing plug capable of being inserted into the conical part.

According to the above-mentioned all-plastic recyclable pressing pump, the bent nozzle includes a lower connecting pipe and a transverse pipe; the upper conical projection is provided on the inner top of the lower connecting pipe, an inserting groove connected to the pump rod is arranged in the upper conical projection, and the top of the inserting groove is communicated with the transverse pipe.

According to the above-mentioned all-plastic recyclable pressing pump, the latching mechanism includes an annular step provided on an inner wall of the pump chamber and configured to fix the locking cap; an outer wall of the pump rod is provided with vertical protruding strips; the locking cap is arranged with a locking cap hole for the pump rod to pass through, an inner wall of the locking cap hole is provided with an arc ring capable of cooperating with the vertical protruding strips, and two sides of the arc ring are provided with limiting blocks.

According to the above-mentioned all-plastic recyclable pressing pump, the driving structure includes an upper limiting convex rib provided on the outer wall of the pump rod above the liquid inlet, and a lower limiting convex ring provided on the outer wall of the pump rod below the liquid inlet.

According to the above-mentioned all-plastic recyclable pressing pump, the one-way valve includes a pump bead provided at the lower end of the pump chamber.

According to the above-mentioned all-plastic recyclable pressing pump, the pump body, the bottle locking cap, the pump rod, the bent nozzle, the locking cap, the liquid extraction assembly, the one-way valve, and the annular elastic piece are all injection-molded by plastic.

Compared with the related art, the present disclosure has the following advantages.

1. The annular elastic piece is provided with at least two outwardly protruding protrusions, and an inwardly recessed recess is arranged between two adjacent protrusions. The recesses replace openings to reduce an elastic coefficient of the annular elastic piece so that the annular elastic piece is more easily deformed and has a better rebound effect. There is no need to cut out openings to damage the structural strength of the annular elastic piece, which improves its service life and reduces the generation of transverse stresses, resulting in smoother movement.
2. The locking cap is provided with the lower conical projection, and the bent nozzle is provided with the upper conical projection so that a bidirectional conical guide is formed. The annular elastic piece elastically expands and contracts between the above-mentioned bidirectional conical projections so that the annular elastic piece slides up and down more smoothly, and the liquid discharging is stable and uniform.
3. The pump body, the bottle locking cap, the pump rod, the bent nozzle, the locking cap, the liquid extraction assembly, the one-way valve, and the annular elastic piece are all injection-molded by plastic so that the pressing pump can reach the standard of efficient recycling.

BRIEF DESCRIPTION OF THE DRAWINGS

Specific implementations of the present disclosure are described in further detail below in conjunction with the accompanying drawings. In the drawings.

DETAILED DESCRIPTION OF THE EMBODIMENTS

The present disclosure is further described below in conjunction with the accompanying drawings.

Figure 1:
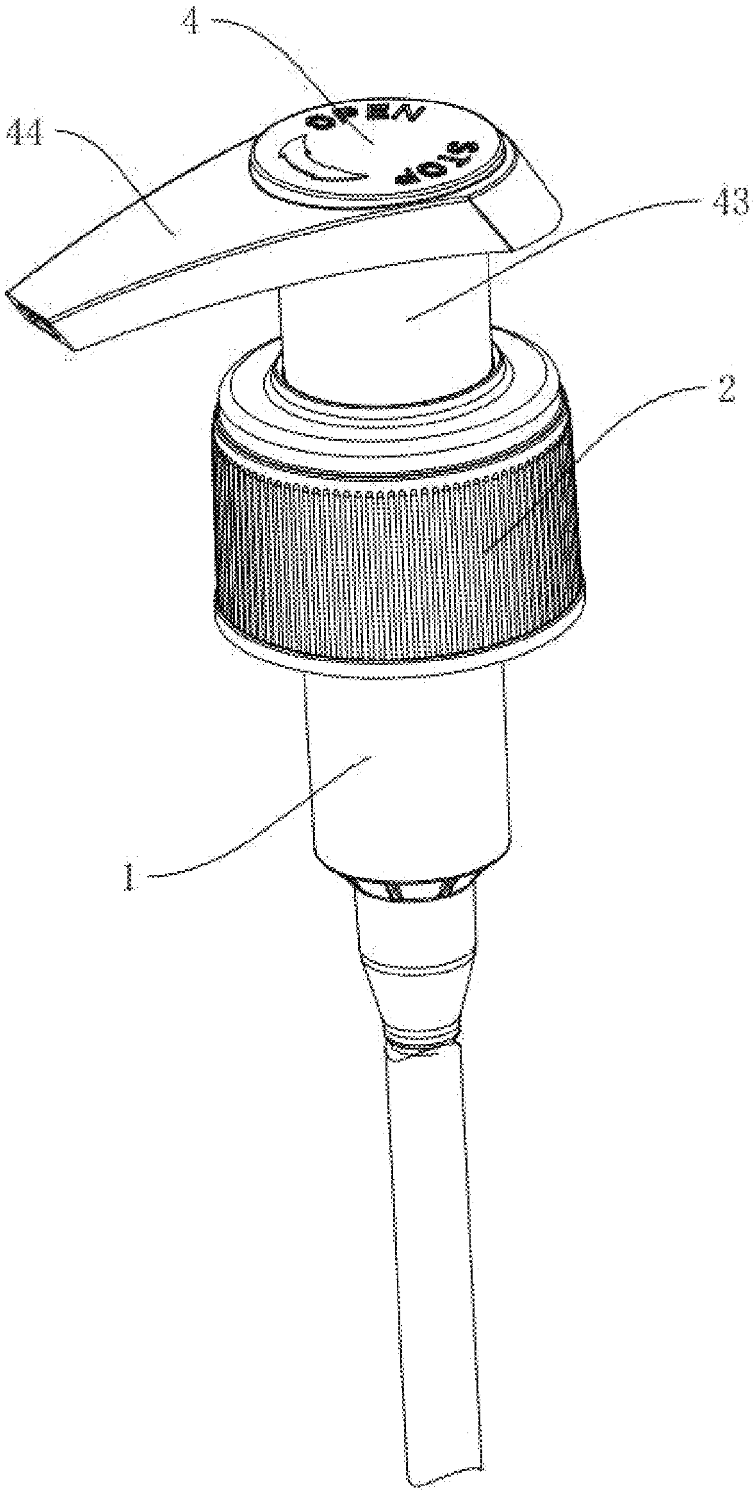
FIG. 1 is a schematic structural diagram of the present disclosure.
Figure 2:
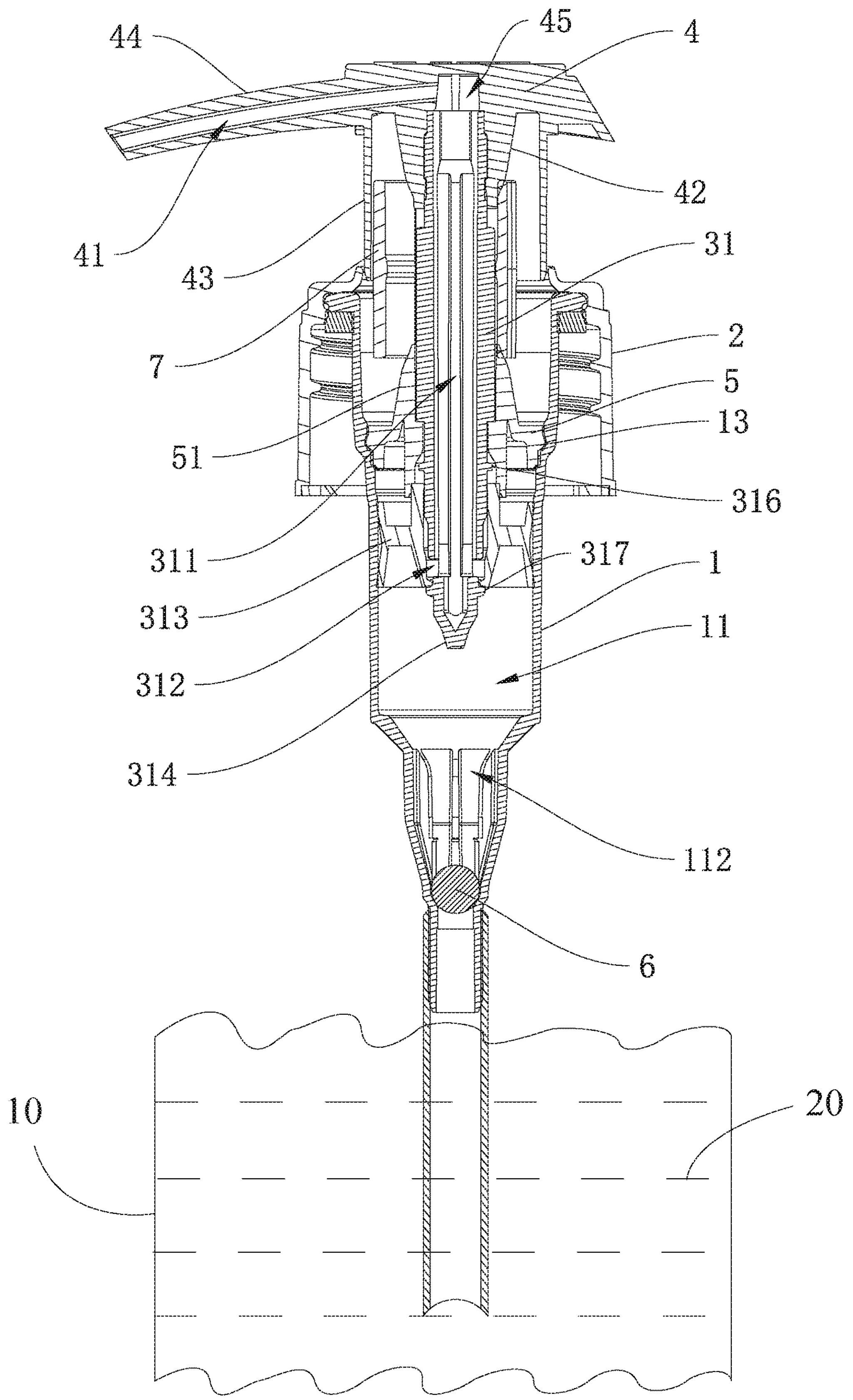
FIG. 2 is a sectional view of the present disclosure.
Figure 3:
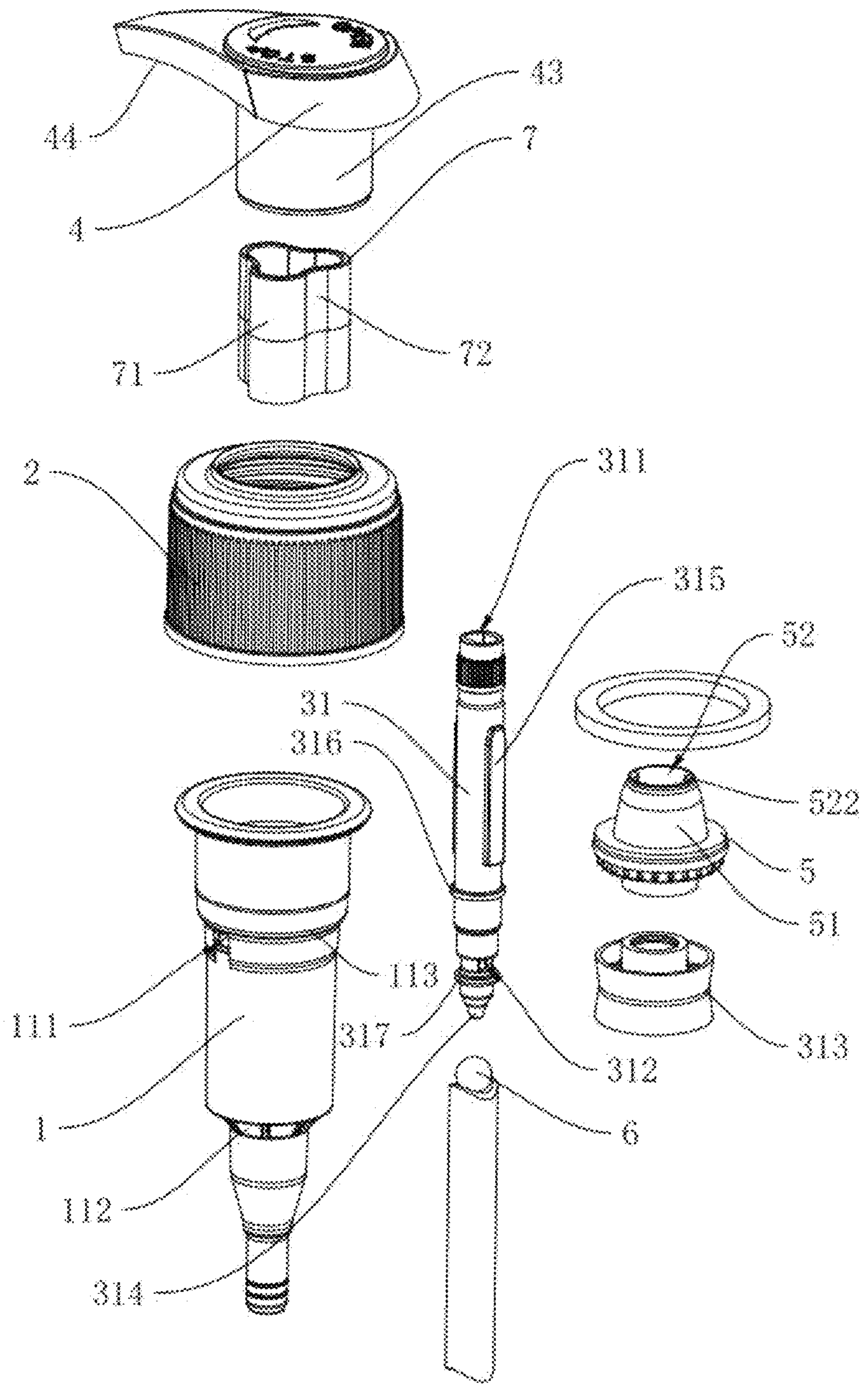
FIG. 3 is an exploded schematic diagram of the present disclosure.
Figure 4:
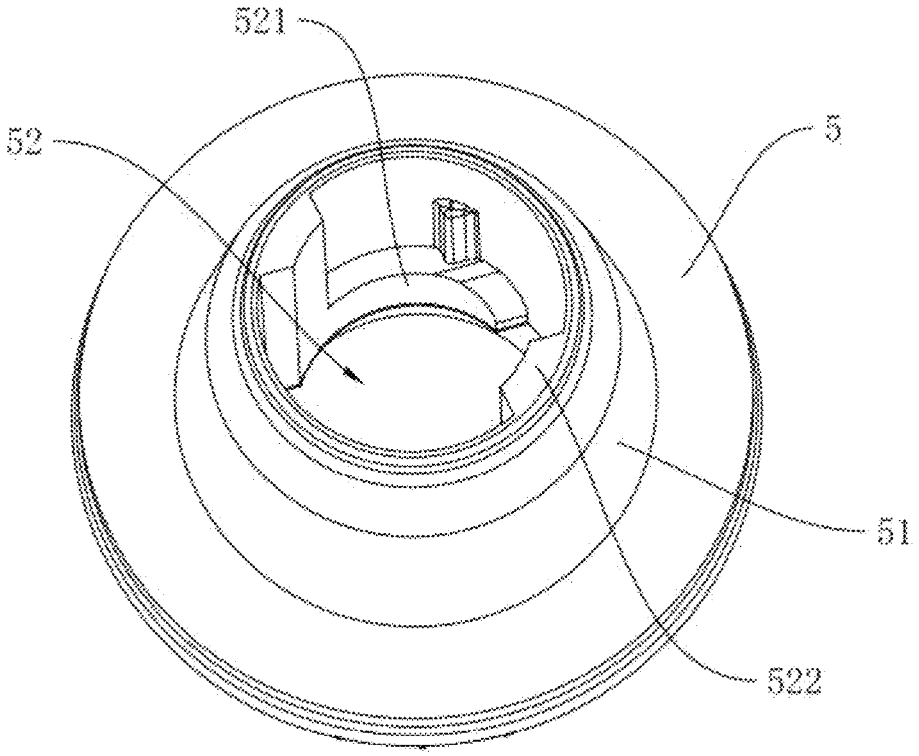
FIG. 4 is a schematic structural diagram of a locking cap of the present disclosure.
Figure 5:
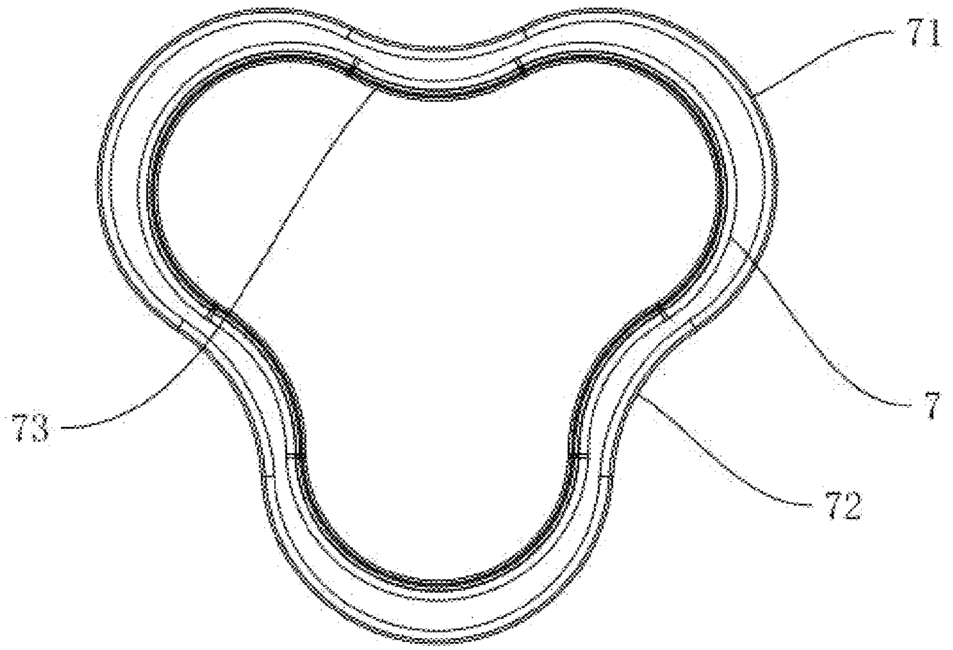
FIG. 5 is a top view of the present disclosure when an annular elastic piece is provided with three outwardly protruding protrusions.
Figure 6:
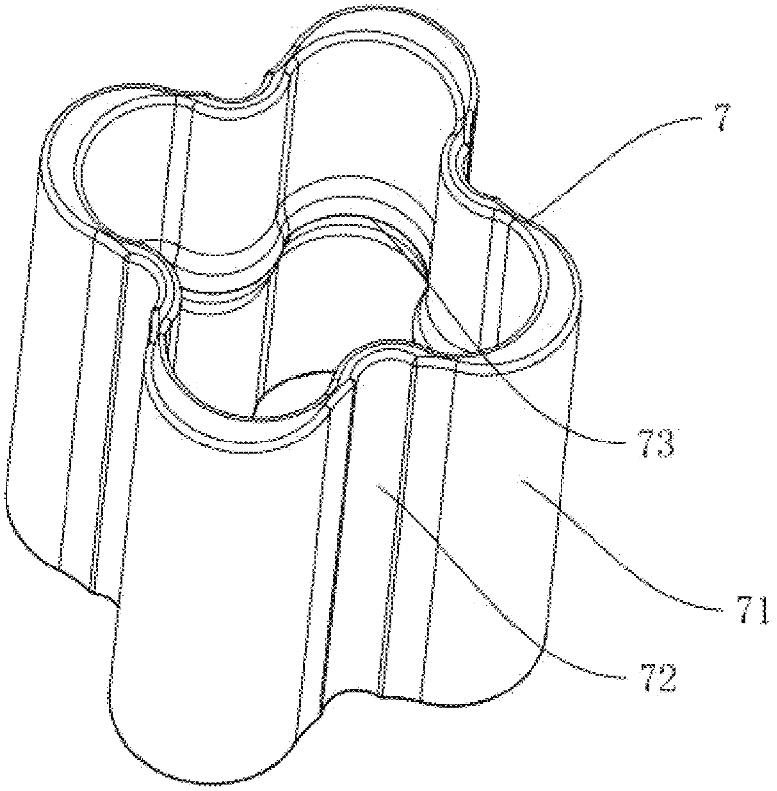
FIG. 6 is a schematic structural diagram of the present disclosure when an annular elastic piece is provided with four outwardly protruding protrusions.
Figure 7:
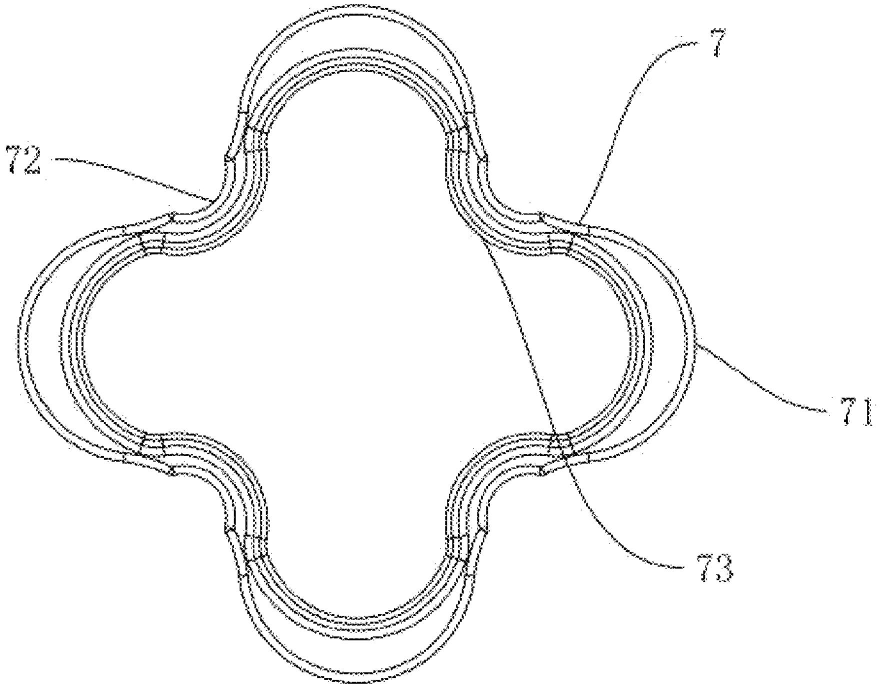
FIG. 7 is a top view of the present disclosure when an annular elastic piece is provided with four outwardly protruding protrusions.

An all-plastic recyclable pressing pump as shown in FIGS. 1-7 includes a pump body 1. The pump body 1 is provided with a pump chamber 11 with a lower part for liquid to enter, and a bottle locking cap 2 is connected to the pump body 1. A liquid extraction assembly capable of moving up and down in the pump chamber 11 to extract liquid 20 in the bottle upwards is provided in the pump chamber 11. The liquid extraction assembly includes a pump rod 31, and a bent nozzle 4 capable of driving the operation of the liquid extraction assembly is connected to an upper end of the pump rod 31. A liquid outlet channel 41 is arranged in the bent nozzle 4, and a locking cap 5 capable of limiting the liquid extraction assembly from disengaging from the pump chamber 11 is provided in the pump chamber 11. A latching mechanism capable of limiting a downward movement of the bent nozzle 4 when the bent nozzle 4 stays in a latching position is provided between the pump rod 31 and the locking cap 5. A scavenge port 111 is arranged on a wall of the pump chamber 11. A lower end of the pump chamber 11 is provided with a one-way valve 6 capable of allowing the liquid 20 in the bottle body 10 to pass through and enter the pump chamber 11 when the liquid extraction assembly moves. The one-way valve 6 includes a pump bead provided at the lower end of the pump chamber 11. A lower part of the liquid extraction assembly is provided with a control valve capable of controlling the liquid 20 in the pump chamber 11 to be ejected from the liquid outlet channel 41. The locking cap 5 is provided with a lower conical projection 51 with a small upper part and a large lower part. The bent nozzle 4 is provided with an upper conical projection 42 with a large upper part and a small lower part. The pump rod 31 between the locking cap 5 and the bent nozzle 4 is provided with an annular elastic piece 7 capable of resetting the liquid extraction assembly after the liquid extraction assembly is pressed down. The annular elastic piece 7 is provided with at least two outwardly protruding protrusions 71, and an inwardly recessed recess 72 is arranged between two adjacent protrusions 71.

In this solution, the recesses 72 replace openings to reduce an elastic coefficient of the annular elastic piece 7 so that the annular elastic piece 7 is more easily deformed and has a better rebound effect. There is no need to cut out openings to damage the structural strength of the annular elastic piece 7, which improves its service life and reduces the generation of transverse stresses, resulting in smoother movement. The locking cap 5 is provided with the lower conical projection 51, and the bent nozzle 4 is provided with the upper conical projection 42 so that a bidirectional conical guide is formed. The annular elastic piece 7 elastically expands and contracts between the above-mentioned bidirectional conical projections so that the annular clastic piece 7 slides up and down more smoothly, and the liquid discharging is stable and uniform.

In one embodiment, the annular elastic piece 7 is provided with three outwardly protruding protrusions 71, and the three outwardly protruding protrusions 71 are evenly distributed on the annular elastic piece 7 in a circumferential direction. The number of recesses 72 is three, and each recess 72 is arranged between two adjacent protrusions 71. Such an arrangement not only optimizes space utilization, but also enhances the balanced response capability of the assembly when subjected to forces. The presence of the recesses 72 may also help reduce stress concentrations and improve the stability and durability of the whole system under dynamic loading conditions.

In one embodiment, the annular elastic piece 7 is provided with four outwardly protruding protrusions 71, and the four outwardly protruding protrusions 71 are evenly distributed on the annular elastic piece 7 in a circumferential direction. The number of recesses 72 is four, and each recess 72 is arranged between two adjacent protrusions 71. Such an arrangement not only optimizes space utilization, but also enhances the balanced response capability of the assembly when subjected to forces. The presence of the recesses 72 may also help reduce the concentration of stresses and improve the stability and durability of the whole system under dynamic loading conditions.

In one embodiment, an inner wall of the annular elastic piece 7 is provided with inwardly protruding reinforcing ribs 73 so that the annular elastic piece 7 has stronger stress resistance, is not easy to be damaged, and has a longer service life.

In one embodiment, the protrusion 71 and the recess 72 are both arc-shaped, thereby reducing the concentration of stresses and improving the stress resistance so as not to be damaged.

The pump body 1, the bottle locking cap 2, the pump rod 31, the bent nozzle 4, the locking cap 5, the liquid extraction assembly, the one-way valve 6, and the annular elastic piece 7 are all injection-molded by plastic. In one embodiment, the whole product of the pressing pump is made of ≤10% PE+≥90% PP, which can realize efficient recycling, is energy-saving and environmentally friendly, and meets the standard of efficient recycling.

The bent nozzle 4 includes a lower connecting pipe 43 and a transverse pipe 44. The upper conical projection 42 is provided on the inner top of the lower connecting pipe 43, an inserting groove 45 connected to the pump rod 31 is arranged in the upper conical projection 42, and the top of the inserting groove 45 is communicated with the transverse pipe 44. The lower connecting pipe 43, the transverse pipe 44, and the upper conical projection 42 are integrally injection-molded.

A liquid extraction channel 311 is arranged in the pump rod 31, and an upper part of the liquid extraction channel 311 is communicated with the liquid outlet channel 41. The control valve includes a liquid inlet 312 arranged at a lower part of the pump rod 31 and communicating the liquid extraction channel 311 and the pump chamber 11. An outer side of the pump rod 31 is sleeved by a suction plug 313 capable of sliding relative to the pump rod 31 and sealing the liquid inlet 312, and an outer wall of the pump rod 31 is provided with a driving structure capable of driving the suction plug 313 to slide. The lower part of the pump chamber 11 is provided with a conical part 112 capable of limiting the downward sliding of the suction plug 313 and allowing the lower part of the pump rod 31 to be inserted. The bottom of the pump rod 31 is provided with a conical sealing plug 314 capable of being inserted into the conical part 112. After the emulsion in the bottle body 10 removes the pump bead and enters the pump chamber 11, it enters the liquid extraction channel 311 from the liquid inlet 312 and then is ejected from the liquid outlet channel 41.

The latching mechanism includes an annular step 113 provided on an inner wall of the pump chamber 11 and configured to fix the locking cap 5. An outer wall of the pump rod 31 is provided with vertical protruding strips 315. The locking cap 5 is arranged with a locking cap hole 52 for the pump rod 31 to pass through, an inner wall of the locking cap hole 52 is provided with an arc ring 521 capable of cooperating with the vertical protruding strips 315, and two sides of the arc ring 521 are provided with limiting blocks 522.

The driving structure includes an upper limiting convex rib 316 provided on the outer wall of the pump rod 31 above the liquid inlet 312, and a lower limiting convex ring 317 provided on the outer wall of the pump rod 31 below the liquid inlet 312.

The invention claimed is:

1. An all-plastic recyclable pressing pump, comprising a pump body, wherein the pump body is provided with a pump chamber with a lower part for liquid to enter, and a bottle locking cap is connected to the pump body; a liquid extraction assembly configured for moving up and down in the pump chamber to extract liquid in a bottle body upwards is provided in the pump chamber; the liquid extraction assembly comprises a pump rod, and a bent nozzle configured for driving the operation of the liquid extraction assembly is connected to an upper end of the pump rod; a liquid outlet channel is arranged in the bent nozzle, and a locking cap configured for limiting the liquid extraction assembly from disengaging from the pump chamber is provided in the pump chamber; a latching mechanism configured for limiting a downward movement of the bent nozzle when the bent nozzle stays in a latching position is provided between the pump rod and the locking cap; a scavenge port is arranged on a wall of the pump chamber; a lower end of the pump chamber is provided with a one-way valve configured for allowing a liquid in the bottle body to pass through and enter the pump chamber when the liquid extraction assembly moves; a lower part of the liquid extraction assembly is provided with a control valve configured for controlling the liquid in the pump chamber to be ejected from the liquid outlet channel; the locking cap is provided with a lower conical projection with a small upper part and a large lower part; the bent nozzle is provided with an upper conical projection with a large upper part and a small lower part; the pump rod between the locking cap and the bent nozzle is provided with an annular elastic piece configured for resetting the liquid extraction assembly after the liquid extraction assembly is pressed down; the annular elastic piece is provided with at least two outwardly protruding protrusions, and an inwardly recessed recess is arranged between two adjacent protrusions.

2. The all-plastic recyclable pressing pump according to claim 1, wherein an inner wall of the annular elastic piece is provided with inwardly protruding reinforcing ribs.

3. The all-plastic recyclable pressing pump according to claim 1, wherein the protrusion and the recess are both arc-shaped.

4. The all-plastic recyclable pressing pump according to claim 1, wherein a liquid extraction channel is arranged in the pump rod, and an upper part of the liquid extraction channel is communicated with the liquid outlet channel; the control valve comprises a liquid inlet arranged at a lower part of the pump rod and communicating the liquid extraction channel and the pump chamber; an outer side of the pump rod is sleeved by a suction plug configured for sliding relative to the pump rod and sealing the liquid inlet, and an outer wall of the pump rod is provided with a driving structure configured for driving the suction plug to slide; the lower part of the pump chamber is provided with a conical part configured for limiting the downward sliding of the suction plug and allowing the lower part of the pump rod to be inserted; the bottom of the pump rod is provided with a conical sealing plug configured for being inserted into the conical part.

5. The all-plastic recyclable pressing pump according to claim 4, wherein the driving structure comprises an upper limiting convex rib provided on the outer wall of the pump rod above the liquid inlet, and a lower limiting convex ring provided on the outer wall of the pump rod below the liquid inlet.

6. The all-plastic recyclable pressing pump according to claim 1, wherein the bent nozzle comprises a lower connecting pipe and a transverse pipe; the upper conical projection is provided on the inner top of the lower connecting pipe, an inserting groove connected to the pump rod is arranged in the upper conical projection, and the top of the inserting groove is communicated with the transverse pipe.

7. The all-plastic recyclable pressing pump according to claim 1, wherein the latching mechanism comprises an annular step provided on an inner wall of the pump chamber and configured to fix the locking cap; an outer wall of the pump rod is provided with vertical protruding strips; the locking cap is arranged with a locking cap hole for the pump rod to pass through, an inner wall of the locking cap hole is provided with an arc ring configured for cooperating with the vertical protruding strips, and two sides of the arc ring are provided with limiting blocks.

8. The all-plastic recyclable pressing pump according to claim 1, wherein the one-way valve comprises a pump bead provided at the lower end of the pump chamber.

9. The all-plastic recyclable pressing pump according to claim 1, wherein the pump body, the bottle locking cap, the pump rod, the bent nozzle, the locking cap, the liquid extraction assembly, the one-way valve, and the annular elastic piece are all injection-molded by plastic.

* * * * *